United States Patent [19]

Matsumoto et al.

[11] 4,369,671
[45] Jan. 25, 1983

[54] TORQUE TRANSFER MECHANISM WITH HYDRAULIC CONTROL SYSTEM FOR A FOUR WHEEL DRIVE VEHICLE

[75] Inventors: Goichi Matsumoto, Okazaki; Yoichi Hayakawa, Toyoake, both of Japan

[73] Assignee: Aisin Warner Kabushiki Kaisha, Aichi, Japan

[21] Appl. No.: 213,715

[22] Filed: Dec. 5, 1980

[30] Foreign Application Priority Data

Dec. 12, 1979 [JP] Japan .................. 54-161339

[51] Int. Cl.³ .................. B60K 17/34; B60K 41/04
[52] U.S. Cl. .................. 74/665 GA; 74/740; 74/785; 74/869; 180/247
[58] Field of Search .................. 74/740, 752 R, 752 A, 74/785, 867, 868, 869, 665 G, 665 GA; 180/247

[56] References Cited

U.S. PATENT DOCUMENTS

3,963,085 6/1976 Vinton .................. 180/247
4,274,303 6/1981 Shindo et al. .................. 74/740

*Primary Examiner*—Allan D. Herrmann
*Attorney, Agent, or Firm*—Blum, Kaplan, Friedman, Silberman and Beran

[57] ABSTRACT

A four wheel drive torque transfer mechanism with a hydraulic control system is switchable between two wheel drive and four wheel drive during running of a vehicle having an automatic transmission. A reducer permits direct coupling or reduced speed ratio drives. A parking gear associating with the transfer device requires only small modification to the conventional parking mechanism. The hydraulic control system automatically actuates the reducer to provide a reduced speed-high torque output when a governor output responsive to vehicle speed, falls below a predetermined level.

18 Claims, 5 Drawing Figures

TORQUE TRANSFER MECHANISM WITH HYDRAULIC CONTROL SYSTEM FOR A FOUR WHEEL DRIVE VEHICLE

BACKGROUND OF THE INVENTION

This invention relates generally to a torque transfer mechanism for vehicles with an automatic transmission and more particularly, to a torque transfer mechanism for vehicles having the option of a two or a four wheel drive. Four wheel drive vehicles are becoming more popular in both large and small vehicles. These vehicles generally provide for the option of either two or four wheel drive. However, the torque transfer devices associated with these vehicles are complex, do not operate smoothly, and component wear is high.

What is needed is a torque transfer mechanism for a four wheel drive vehicle which is simple in construction, smooth in operation and has a long operating life. The ability to shift between two and four wheel drive and to switch to a speed reduction gearing ratio while the vehicle is in motion is also desirable.

SUMMARY OF THE INVENTION

Generally speaking, in accordance with the invention, a torque transfer mechanism especially suitable for a four wheel drive vehicle is provided. The transfer mechanism is mounted on a vehicle with an automatic transmission and includes a reducer which provides for both a direct coupling and a speed reduction gearing ratio. The transfer mechanism also allows for switching between two wheel and four wheel drive during running operation of the vehicle. This has been difficult to accomplish in prior art four wheel drive transfer systems.

The torque transfer mechanism includes an input shaft for receiving torque from an automatic gear transmission, a first output shaft coupled with one of the front and rear drive axles, a second output shaft coupled with the other one of the drive axles, a speed reducer provided between the input shaft and the first output shaft for transmitting the rotation of the input shaft to the output shaft at a reduced speed; a first friction member for nullifying the operation of the reducer and directly coupling the input shaft with the first output shaft; a second friction member for activating the reducer; and a link mechanism for transmitting the rotation of the first output shaft to the second output shaft.

The hydraulic control system comprises a first conduit for supplying pressurized fluid to a hydraulic servo motor to engage the first friction member; a second conduit for supplying pressurized fluid to a hydraulic servo motor to engage the second friction member; and a valve for selectively connecting a line pressure generated by a hydraulic control system of the automatic transmission, either to the first or second conduit. The connecting valve is controlled by both governor and line pressures generated in the hydraulic control system of the automatic transmission, connecting line pressure to operate the reducer only when the governor pressure drops below a predetermined level.

Accordingly, it is an object of this invention to provide an improved torque transfer mechanism for a four wheel drive which is shiftable for direct coupling and driving at a speed reduced gear ratio.

Another object of this invention is to provide an improved torque transfer mechanism for a four wheel drive vehicle which is adapted to deliver engine power directly to the output shaft of the transfer mechanism in normal operating conditions.

A further object of this invention is to provide an improved torque transfer mechanism for four wheel drive vehicles including a speed reducer between the input shaft and the output shaft.

Still another object of this invention is to provide an improved torque transfer mechanism for a four wheel drive vehicle having a reducer which is bypassed under normal operating conditions thereby prolonging the service life of the reducer.

Yet another object of this invention is to provide an improved torque transfer mechanism for a four wheel drive vehicle having an output shaft coupled with a parking gear of an automatic transmission, whereby only slight modification of the conventional parking mechanism is required.

A further object is to provide an improved torque transfer mechanism for a four wheel drive vehicle which is hydraulically controlled for automatic downgearing in response to vehicle speed.

Yet another object of this invention is to provide an improved torque transfer mechanism for a four wheel drive vehicle having a hydraulic control system wherein a switch to a reduced gear ratio is prevented and direct drive is maintained when vehicle speed exceeds a selected value, whereby engine over-running is avoided.

Still other objects and advantages of the invention will in part be obvious and will in part be apparent from the specification.

The invention accordingly comprises the features of construction, combinations of elements, and arrangement of parts which will be exemplified in the constructions hereinafter set forth, and the scope of the invention will be indicated in the claims.

BRIEF DESCRIPTION OF THE DRAWINGS

For a fuller understanding of the invention, reference is had to the following description taken in connection with the accompanying drawings, in which.

DESCRIPTION OF THE PREFERRED EMBODIMENTS

Figure 1:
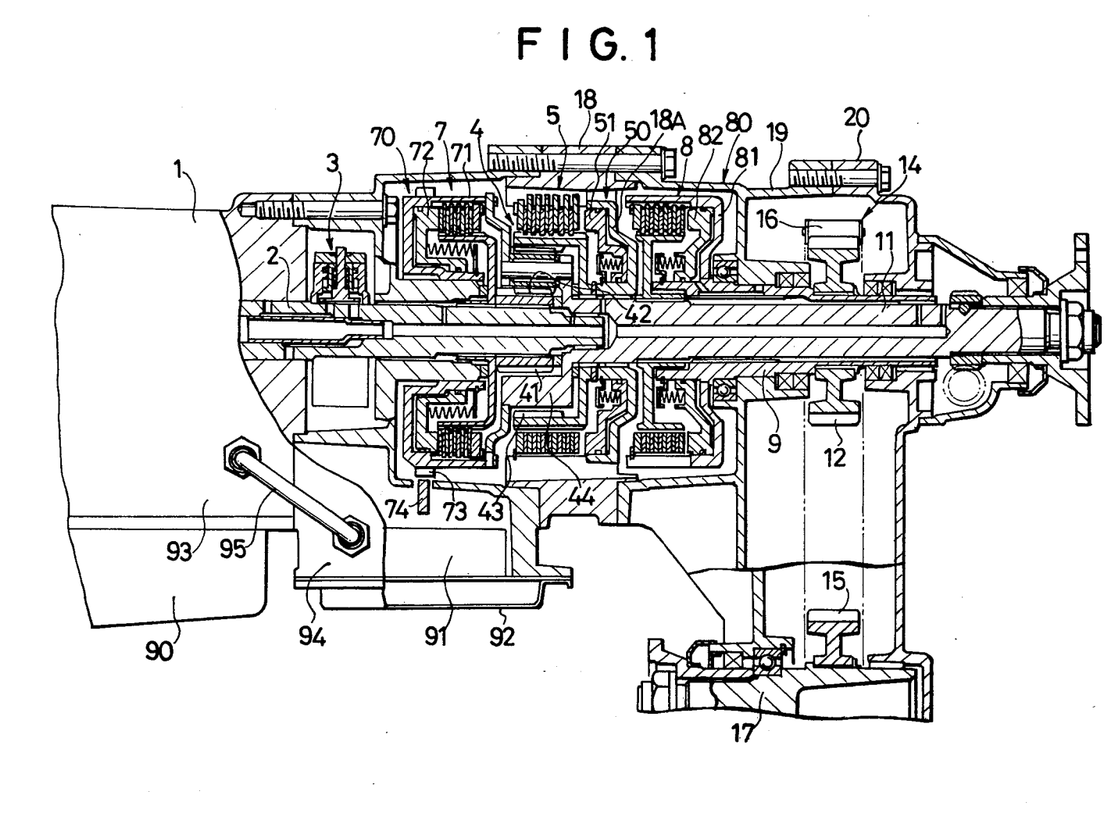
FIG. 1 is a schematic sectional view of a transfer mechanism in accordance with this invention.

Referring to FIG. 1, there is shown a four wheel drive torque transfer mechanism according to the present invention. The transfer mechanism is connected to an automatic gear transmission assembly 1 and includes an input shaft 2 which is also the output shaft of the gear mechanism of the automatic gear transmission assembly 1. Also, included in the transfer mechanism is a governor valve 3 fixedly mounted on the input shaft 2; a planetary gear set 4 having a sun gear 41 splined on the input shaft 2, a pinion 42 meshed with the sun gear 41, a ring gear 43 meshed with the pinion 42 and a carrier 44 rotatably supporting the pinion 42 and coupled with one output shaft 11 of the torque transfer mechanism. The transfer mechanism also includes: a friction brake 5 for engaging the ring gear 43 with a transfer device casing 18; a hydraulic servo motor 50 for the friction brake 5 comprised of a cylinder 18A formed in the transfer device casing 18 and a piston 51 slidably fitted in the cylinder 18A; a friction clutch 7 operated by a hydraulic servo motor 70 comprising an annular cylinder 71 connected to the carrier 44 and a piston 72 slidably fitted in the cylinder 71, for coupling and uncoupling the sun gear 41 and the carrier 44. The transfer mechanism further includes a friction clutch 8 for coupling the output shaft 11, connected to the carrier 44, with a sleeve 9 connected to one of the sprockets 12 of a linkage mechanism which drives the other output shaft 17 of the transfer mechanism as will be described hereinafter. Also, included in the transfer mechanism are a hydraulic servo motor 80 comprising a cylinder 81 welded to the sleeve 9, which is rotatably retained in the transfer casings 19, 20 and a piston 82 slidably fitted in the cylinder 81; an other output shaft 17 of the transfer mechanism; and a link mechanism 14 comprised of the sprocket 12 splined on the sleeve 9, a sprocket 15 splined on the output shaft 17 and a chain 16 passed around the sprockets 12 and 15.

The annular hydraulic cylinder 71 of the friction clutch 7 is formed with a circumferential parking gear 73 which is engageable with a parking lock pawl 74 when the shift lever of the automatic transmission is switched to parking position, thereby locking the output shaft 11.

FIG. 1 also shows an oil pan 90 of the automatic transmission, a hydraulic control system (valve casing) 91 which controls pressurized fluid flows to and from the hydraulic servo motors 70, 80, 50 of the clutches 7, 8 and brake 5 respectively of the four wheel drive torque transfer device, and an oil pan 92 for the hydraulic control system 91. The pressurized working fluid is supplied from the oil pan 90 to the hydraulic servo motors 70, 80, 50 of the clutches 7, 8 and the brake 5 by the operation of the hydraulic control system 91 through a pipe 95 which is mounted on a casing 93 of the automatic gear transmission 1 and a transfer casing 94.

Figure 2:
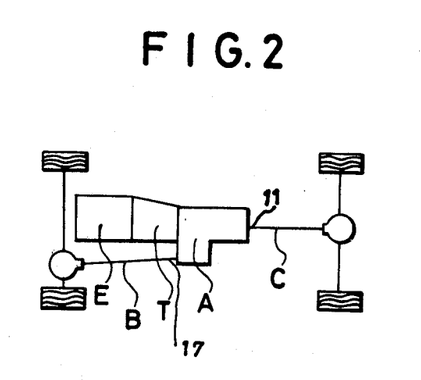
FIG. 2 is a diagram of a power transmission system of a vehicle using the transfer mechanism of FIG. 1.

As shown at A of FIG. 2, the transfer device is attached to an automatic transmission T of a vehicle engine E and has one of its output shafts 11 coupled with a rear propeller shaft C and the other output shaft 17 coupled with a front propeller shaft B.

In a normal operating condition, the line pressure which is supplied from the hydraulic control system of the automatic transmission is fed to the servo motor 70 to engage the clutch 7, while draining the servo motors 50, 80 to release the brake 5 and clutch 8 respectively. As a result, the sun gear 41 and carrier 44 of the planetary gear set 4 are connected with each other and rotate together to transfer power from the input shaft 2 to the rear drive output shaft 11 at a reduction ratio of 1 to effect direct rear two wheel drive. In this instance, the power from the input shaft 2 is transmitted to the output shaft 11 through the clutch 7 and carrier 44, bypassing the gears 41, 42, 43 to relieve their tooth faces of the loads which would otherwise be imposed thereon. In other words, the pinion 42 does not rotate relative to the sun gear 41 or ring gear 43. Thereby, service life of the respective gears is prolonged.

If during two wheel drive operation a change to four wheel drive is desired, a hydraulic control valve for the servo motor of the transfer mechanism is actuated by a lever or switch which is provided in the vicinity of the driver's seat, gradually supplying the line pressure to the servo motor 80 to engage the clutch 8 smoothly, thereby coupling the output shaft 11 and sleeve 9 with each other. As a result, in addition to driving the rear drive output shaft 11, the power is transmitted simultaneously from the input shaft 2 to the front wheels through the linkage mechanism 14, output shaft 17 and front propeller shaft B to effect four wheel drive at a reduction ratio of 1. Again, the pinion 42 does not rotate relative to the sun gear 41 or ring gear 43.

When a greater output torque becomes necessary during four wheel drive operation, for example, for climbing a steep slope, the hydraulic control valve is operated to supply line pressure gradually to the hydraulic servo motor 50 and at the same time to drain the hydraulic servo motor 70 with suitable timing, thereby gradually engaging the brake 5 while smoothly releasing the clutch 7. As a result, the sun gear 41 and carrier 44 are unlocked from each other and the ring gear 43 is fixed to the transfer casing 18. Thus, power is transmitted from the input shaft 2 to output shafts 11 and 17 after speed reduction through the sun gear 41, pinion 42 and carrier 44 to provide four wheel drive of a larger torque.

Table 1 indicates the engaged and released states of the brake 5 and clutches 7 and 8 in different modes of operation as provided by the transfer device and control system of the invention.

TABLE 1

| Friction Element $\longrightarrow$ | 5 | 7 | 8 | Reduction Ratio |
|---|---|---|---|---|
| Two wheel drive | X | 0 | X | 1 |
| Four wheel drive (direct coupling) | X | 0 | 0 | 1 |
| Four wheel drive (at reduced speed) | 0 | X | 0 | $\frac{1+\lambda}{\lambda} = 3.0$ |

In Table 1, the symbols "O" and "X" denote the engaged and released states respectively of the friction element concerned, and the symbol "λ" represents a ratio of the number of teeth of the sun gear 41 to the ring gear 43. The reduction ratio given in the table is for the case where $\lambda=0.5$, as an example.

As stated in the foregoing description, the tranfer device of the invention, which employs a planetary gear set and wet type friction elements operated by hydraulic servo motors, is capable of applying and releasing the respective friction elements smoothly with accurate timing. Thus, switching between two wheel drive and four wheel drive is accomplished, as well as a speed change by the transfer mechanism itself while the vehicle is traveling.

Further, according to the present invention, the power of the input shaft of the transfer mechanism is delivered directly to an output shaft or shafts during the normal direct-coupling two or four wheel drive operations. This is done without transmitting power through the planetary gear set, relieving the gear set of unnecessary loads as described hereinabove.

Furthermore, the carrier of the planetary gear set is connected to one output shaft and to a cylinder of a hydraulic servo motor which is located on the side of the automatic transmission for releasably coupling the carrier with the sun gear. Accordingly, it is possible to provide a parking gear at an end portion of the transfer mechanism, (FIG. 1) contiguous to the automatic transmission. This requires only small modifications to the conventional parking mechanism of the automatic transmission instead of provision of a parking mechanism of a completely new design.

Figure 3:
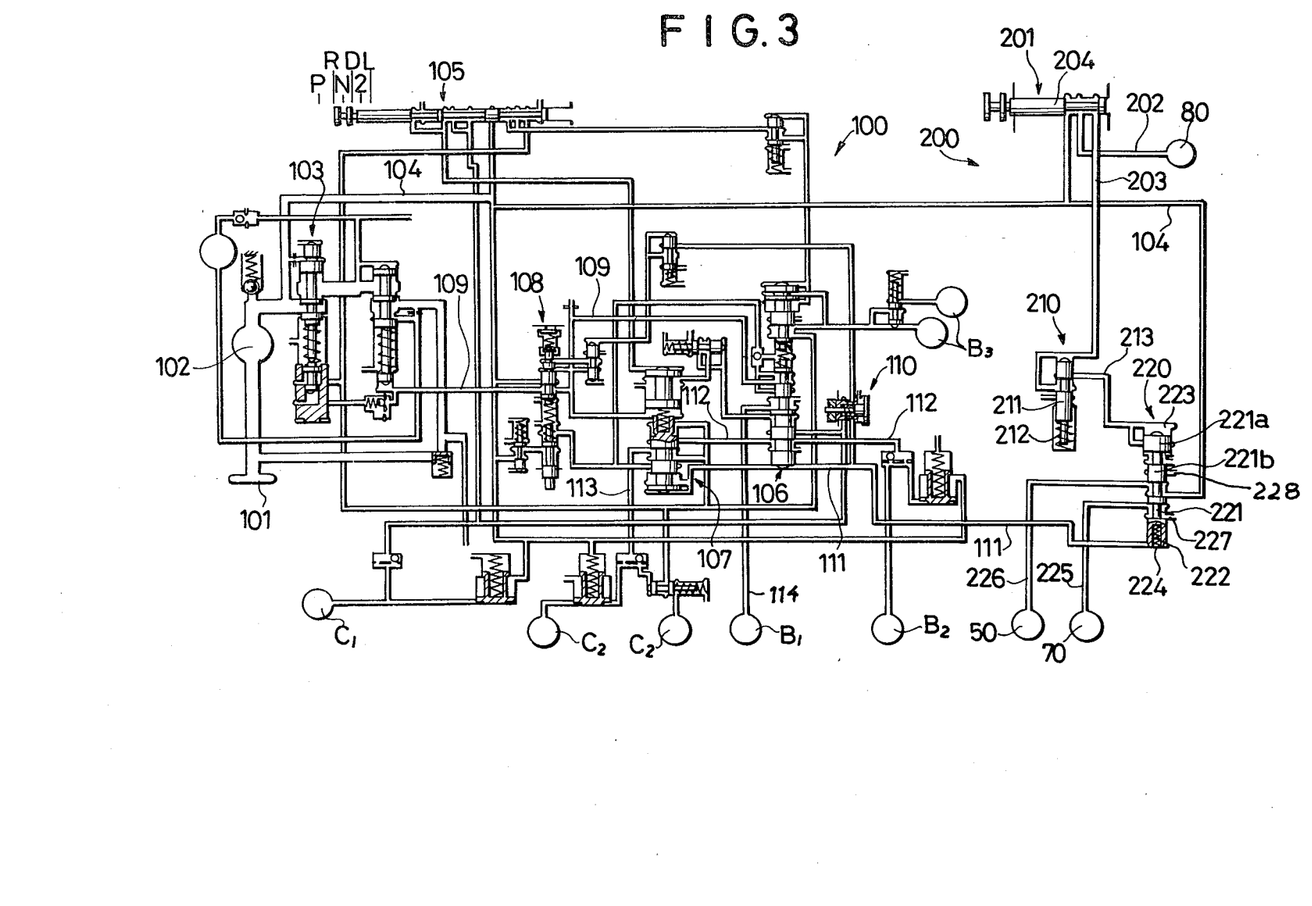
FIG. 3 is a schematic drawing of a hydraulic control system for the torque transfer mechanism of FIG. 1.

Referring now to FIG. 3, there is shown a hydraulic control system 100 for the four wheel drive torque transfer mechanism in accordance with this invention as applied to a vehicle having an automatic transmission of three forward and one reverse speeds.

In the system, oil taken from an oil sump 101 by an oil pump 102 is regulated to a predetermined pressure (line pressure) at the pump output by a regulator valve 103 and delivered to a conduit 104. The pressure inputted to the conduit 104 is fed to a 1-2 shift valve 107 through a manual selector valve 105.

A throttle valve 108 generates a pressure (throttle pressure) in a conduit 109 commensurate with the degree of throttle opening.

A governor valve 110 generates a pressure (governor pressure) in a conduit 111 commensurate with the vehicle speed.

The 1-2 shift valve 106 and 2-3 shift valve 107 open and close the conduits 112 to 114 according to the throttle and governor pressures supplied through conduits 109 and 111, thereby controlling the pressure supply to and drainage of hydraulic servo motors C1, C2, B1, B2 and B3 of clutches and brakes.

In this particular embodiment, the pressure is supplied to servo motor C1 in forward 1st speed, to servo motors C1 and B2 in forward 2nd speed, to servo motors C1, C2 and B2 in forward 3rd speed, and to servo motors C2 and B3 in reverse state.

The four wheel drive torque transfer mechanism is operated by a hydraulic control circuit 200 which includes a speed selector valve 201, a modulator valve 210 and an inhibitor valve 220.

The speed selector valve 201 is operated by a shift lever at the driver's seat to control the communication of conduit 104 with conduits 202 and 203. In two wheel drive, conduit 104 is blocked by a spool 204 of the speed selector valve 201. In direct-coupling four wheel drive, conduit 104 is connected with conduit 202. In four wheel drive at a reduced speed, conduit 104 is connected with conduits 202 and 203.

The modulator valve 210, which is provided with a spool 211 and a spring 212, regulates the pressure in conduit 203 to produce a modulator pressure in conduit 213.

The inhibitor valve 220, which includes a spool 221, a spring 222 and oil chambers 223, 224 switches the connection of conduit 104 to either conduit 225 or 226 in accordance with the modulator pressure acting in the oil chamber 223 against the governor pressure acting in the oil chamber 224 through conduit 111 and against the force of the spring 222.

2-WHEEL DRIVE

In the two wheel drive mode of operation, conduit 104 is not in communication with the conduits 202, 203. Because no pressure is input to the oil chamber 223 of the inhibitor valve 220, the spool 221 is held in the upper position by the spring 222 which connects the conduit 104 with the conduit 225. The line pressure in conduit 104 is supplied to the hydraulic servo motor 70 of the clutch 7 through conduit 225 to engage the clutch 7 with results as described above.

DIRECT-COUPLING 4-WHEEL DRIVE

In direct-coupling four wheel drive operation, conduit 104 is in communication with the conduit 202. Similar to the two wheel drive operation, the line pressure in conduit 104 is supplied to the hydraulic servo motor 70 to the engage the clutch 7. At the same time, the line pressure fed to the conduit 202 is supplied to the servo motor 80 to engage the clutch 8.

4-WHEEL DRIVE AT REDUCED SPEED

In reduced speed four wheel drive operation, conduit 104 is in communication with conduits 202 and 203. The line pressure fed to conduit 203 is regulated by the modulator valve 210 to generate a modulator pressure in conduit 213.

When the governor pressure which is fed to the oil chamber 224 of the inhibitor valve 220 from the conduit 111 is greater than a predetermined value A, the spool 221 is held in the upper position against the modulator pressure acting in the oil chamber 223 through conduit 213, maintaining the direct-coupling four wheel drive condition. If the vehicle speed is lowered and the governor pressure drops below the predetermined value A, the spool 221 is moved downward by the modulator pressure acting in the oil chamber 223 to connect the conduit 104 with conduit 226 while connecting conduit 225 with a drain port 227. The pressure in the servo motor 70 of the clutch 7 is thus drained through the drain port 227 to release the clutch 7. At the same time, the line pressure in conduit 104 is fed to the servo motor 50 of the brake 5 through the conduit 226, engaging the brake 5 to establish the reduced speed four wheel drive condition. If the governor pressure becomes greater than a predetermined value B, where B exceeds A, due to an increase of vehicle speed during four wheel drive operation at reduced speed, the governor pressure overcomes the modulator pressure. This imbalance displaces the spool 221 upward, blocking the connection between conduits 104 and 226 while connecting conduit 226 with a drain port 228 and connecting conduit 104 with conduit 225. The pressurized fluid in the hydraulic servo motor 50 is thus drained through the conduit 226 and the drain port 228 to release the brake 5. Also, line pressure is supplied to the servo motor 70 through the conduit 225 to engage the clutch 7, thereby establishing the direct-coupling four wheel drive condition.

The governor pressure A, which prevails at the time of switching the operation from direct-coupling four wheel drive to reduced speed four wheel drive, is less than the governor pressure B which exists when the operation is switched from reduced speed four wheel drive to direct-coupling four wheel drive, due to the differences in surface area between the lands 221a and 221b of the spool 221.

Figure 4:
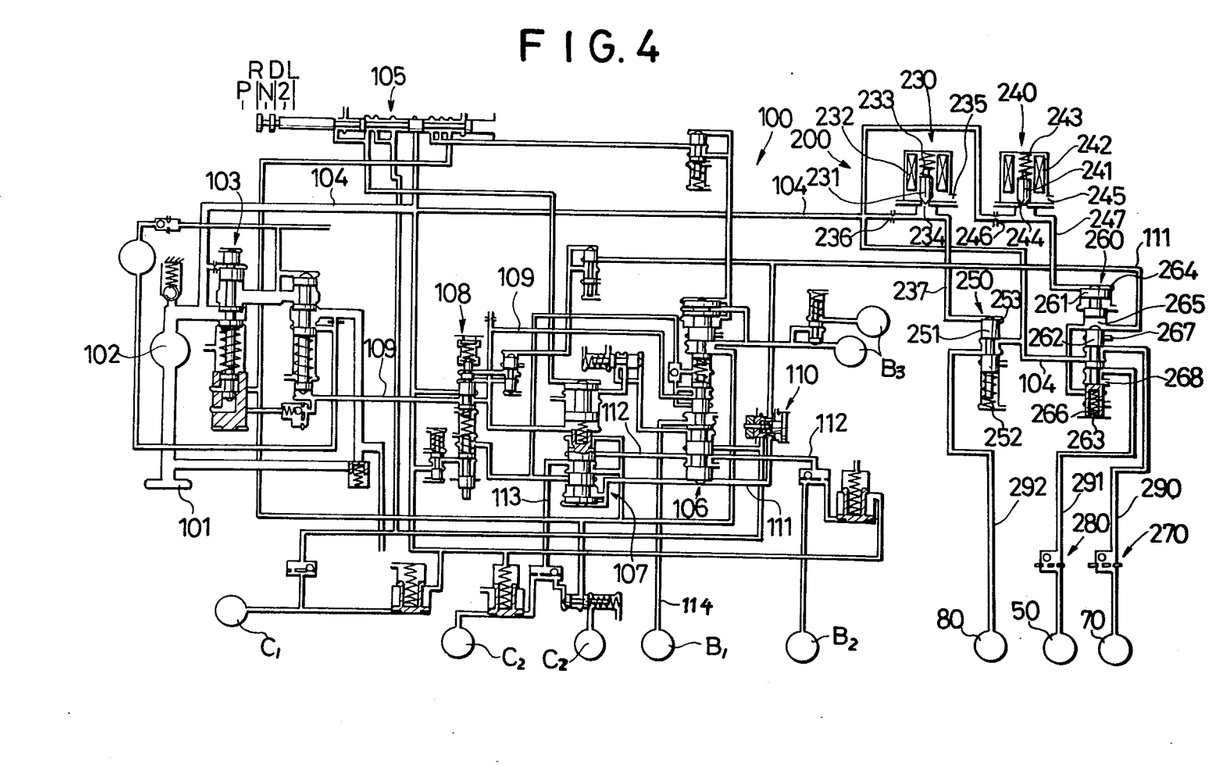
FIGS. 4 and 5 are schematic drawings of alternative hydraulic control systems in accordance with this invention.

FIG. 4, wherein parts common to both FIGS. 3 and 4 have the same reference numerals, illustrates another embodiment of the present invention in which the hydraulic control system 200 of the four wheel drive torque transfer mechanism includes solenoid valves 230, 240, a change-over valve 250, an inhibitor valve 260 and check valves 270, 280.

The solenoid valves 230, 240 comprise moving cores 231, 241, solenoids 232, 242, springs 233, 243, valve ports 234, 244, and drain ports 235, 245, respectively. Upon energizing the solenoids 232, 242, the moving cores 231, 241 are displaced upward to open the ports 234, 244. The pressurized fluid in conduits 237, 247 which are partitioned by orifices 236 and 246, respectively drain through the ports 235, 245. When the solenoids 232, 242 are in a de-energized state, the moving cores 231 and 241 are urged downward by the springs 233, 243 to close the valve ports 234, 244, producing pressure (line pressure) in conduits 237, 247.

The solenoid valves 230, 240 are operated in the manner as shown in Table 2.

TABLE 2
(Ref. FIG. 4)

| Mode of Operation | Solenoid Valve 230 | Solenoid Valve 240 |
|---|---|---|
| 2-wheel drive | De-energized | De-energized |
| Direct-coupling 4-wheel drive | Energized | De-energized |
| Reduced speed 4-wheel drive | Energized | Energized |

The change-over valve 250 comprises a spool 251, a spring 252 and an oil chamber 253, and serves to control the connection between the conduits 104, 292 according to the pressure level prevailing in the oil chamber 253.

The inhibitor valve 260 includes spools 261, 262, a spring 263, and oil chambers 264, 265, 266, and serves to control the connection between the conduits 104, 290 and the connection between the conduits 104, 291 in response to the pressure prevailing in the oil chamber 264 and the governor pressure prevailing in the oil chambers 265, 266.

The hydraulic control system of FIG. 4 operates as follows:

2-WHEEL DRIVE

In the two wheel drive operation, the solenoid valves 230, 240 are both in a de-energized state to produce line pressure in the conduits 237, 247. The line pressure in conduit 237 prevails in the oil chamber 253 of the change-over valve 250, urging the spool 251 downward in FIG. 4 to block communication between the conduits 104, 292. The line pressure in conduit 247 prevails in the oil chamber 264 of the inhibitor valve 260, urging the spools 261, 262 downward to connect the conduit 104 with the conduit 290 thereby feeding the pressure in conduit 104 to the hydraulic servo motor 70 through the check valve 270 to engage the clutch. Servo motor 50 is drained through the port 268.

DIRECT-COUPLING 4-WHEEL DRIVE

In the direct-coupling four wheel drive operation, the solenoid valve 230 is in an energized state so that the pressurized fluid in the conduit 237 is drained through the port 235 and the spool 251 of the change-over valve 250 is urged upward by the spring 252 to connect the conduit 104 with the conduit 292. The pressure in conduit 104 is thus fed to the hydraulic servo motor 80 through the conduit 292 to engage the clutch 8. Since the solenoid valve 240 is in a de-energized state, the clutch 7 is engaged as in two-wheel drive operation and brake 5 is released.

When valve 240 is de-energized, the pressure in the conduit 247 moves the spool 261 downward, blocking conduit 111. Therefore, direct coupled four-wheel drive is not responsive to governor pressure in conduit 111.

REDUCED SPEED 4-WHEEL DRIVE

In the four-wheel drive operation at reduced speed the solenoid valve 230 is in an energized stage, engaging the clutch 8 in the same manner as in the direct-coupling four wheel drive operation. The solenoid valve 240 is also in an energized state and the pressurized fluid in the conduit 247 is also drained, through the port 245. When the governor pressure prevailing in the oil chamber 265 is greater than a predetermined value A, the spool 262 is held in the lower position in the same manner as in the direct-coupling four wheel drive, engaging the clutch 7. As soon as the governor pressure drops below the predetermined value A due to a reduction in the vehicle speed, the spool 262 is moved upward by the spring 266 to block the connection between the conduits 104 and 290. Concurrently the conduit 290 connects with the drain port 267 to drain the pressurized fluid in the hydraulic servo motor 70 of the clutch 7, and the conduit 104 connects with conduit 291 to supply pressure to the hydraulic servo motor 50 through the check valve 280 to engage the brake 5.

As a result of the release of the clutch 7 and engagement of the brake 5, the torque transfer mechanism is put in condition for operation at reduced speed. Under these circumstances, if the governor pressure becomes greater than a predetermined value B (B>A) due to an increase of vehicle speed, the spool 262 is moved downward in FIG. 4 to block the communication between the conduits 104, 291 while connecting the conduit 291 with the drain port 268 to drain pressurized fluid in the hydraulic servo motor 50 whereby the brake 5 is released. At the same time the conduit 104 connects with the conduit 290 to engage the clutch 7, thereby re-establishing the condition for direct-coupling in four wheel drive.

It should be understood that the orifices 236, 246 maintain upstream line pressure in the conduit 104 when the valves 230, 240 are energized to open to the drains 235,245 respectively.

Figure 5:
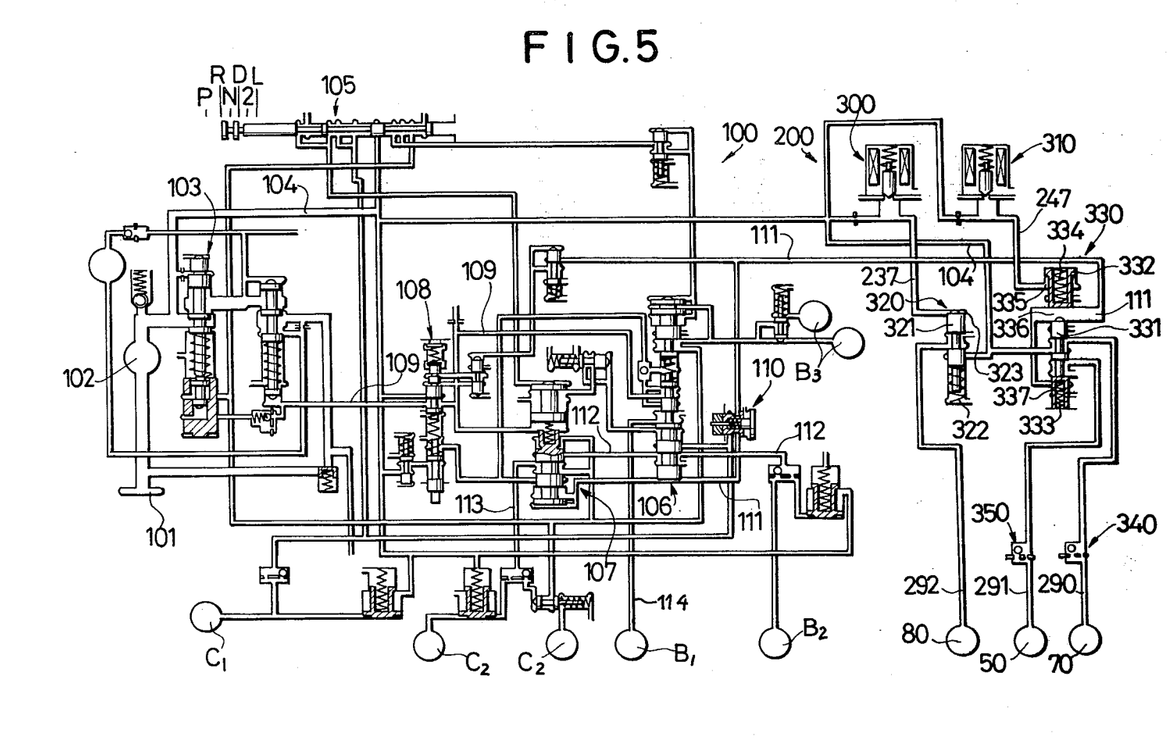

FIG. 5, wherein parts common to FIGS. 3, 4 and 5 have the same reference numerals, illustrates still another embodiment of the present invention, in which the hydraulic control system 200 of the four wheel drive torque transfer mechanism includes solenoid valves 300 and 310, a changeover valve 320, an inhibitor valve 330, and check valves 340 and 350.

The solenoid valves 300 and 310 are of the same construction as in the embodiment of FIG. 4 and are operated in the manner shown in Table 3.

TABLE 3
(Ref. FIG. 5)

| MODE OF OPERATION | SOLENOID VALVE 300 | SOLENOID VALVE 310 |
|---|---|---|
| 2-wheel drive | Energized | Energized |
| Direct-coupling 4-wheel drive | De-energized | Energized |
| Reduced speed 4-wheel drive | De-energized | De-energized |

The change-over valve 320 includes a spool 321, a spring 322 and an oil chamber 323, and plays the role of controlling the connection between the conduits 104, 292 according to the pressure prevailing in the oil chamber 323.

The inhibitor valve 330 includes spools 331, 332, springs 333, 334 and oil chambers 335, 336, 337. The valve 330 serves to control the communication of conduit 104 with either conduit 290 or 291 according to the pressures prevailing in the respective oil chambers and the forces of the springs 333, 334. It is not possible to simultaneously pressurize the servo motors 50 and 70 in any embodiment.

The embodiment of FIG. 5 operates as follows.

2-WHEEL DRIVE

In the two wheel drive operation, both of the solenoid valves 300, 310 are in an energized state so that the spool 321 of the change-over valve 320 is held in the upper position, and the spool 331 of the inhibitor valve 330 is held in the lower position by the spring 334. Thereby, pressure in the conduit 104 is fed to the hydraulic servo motor 70 through conduit 290 to engage the clutch 7, but servo motor 80 is drained and clutch 8 is not driven. Also, servo motor 50 is drained and brake 5 is released.

DIRECT-COUPLING 4-WHEEL DRIVE

In the direct-coupling four wheel drive operation, the solenoid valve 300 is in a de-energized state so that the spool 321 of the change-over valve 320 is moved downward in FIG. 5 to feed the pressure in conduit 104 to the hydraulic servo motor 80 thereby engaging the clutch 8. Valve 310 is still energized so servo motor 70 is pressurized as before to maintain a direct drive continuously.

REDUCED SPEED 4-WHEEL DRIVE

In the reduced speed four wheel drive operation, the solenoid valves 300 and 310 are both in a de-energized state, with the clutch 8 engaged in the same manner as in the direct-coupled four wheel drive operation. The spool 332 of the inhibitor valve 330 is moved upward by the pressure prevailing in the oil chamber 335, and the spool 331 is controlled by the governor pressure from the conduit 111 prevailing in the oil chamber 336. Note, that in direct coupled two- and four-wheel drives described above, energization of valve 310 removes pressure in conduit 247 and allows the spool 332 to descend and block the conduit 111. Thus, the device is not responsive to governor pressure in these direct drives.

When the governor pressure, a function of vehicle speed, is greater than a predetermined value A, the spool 331 is held in the lower position to maintain the direct-coupling condition with the servo motor 70 pressurized from the conduit 104. If the governor pressure drops below the predetermined value A, the spool 331 is pushed upward by the spring 333 to connect the conduits 104 and 291 with each other, thereby engaging the brake 5 to establish the reduced speed four wheel drive condition while simultaneously draining the servo motor 70. As the spool 331 is moved upward in FIG. 5, conduit 111 is also connected with the oil chamber 337 to push the spool 331 upward.

Under these circumstances, if the vehicle speed is increased and the governor pressure in conduit 111 becomes greater than a predetermined value B (B>A) which overcomes the force of the spring 333 and the governor pressure prevailing in the oil chamber 337, the spool 331 moves downward to assume again the condition for direct-coupled four wheel drive with servo motor 70 pressurized and servo motor 50 drained.

As is clear from the foregoing description, the present invention provides a hydraulic control system for a four wheel drive torque transfer mechanism, which is particularly suitable for application to vehicles having an automatic transmission.

Further, overrunning of the vehicle engine is prevented in the four wheel drive operations since the switching from direct-coupling operation to reduced speed operation is prohibited at vehicle speeds over a predetermined value.

In the embodiments described above, and in the related tables, three modes of operation have been described, namely, two-wheel drive, direct coupling four-wheel drive, and reduced speed four-wheel drive. It will be apparent from the figures and the specification that with the same mechanisms and hydraulic control systems, it is also possible in each embodiment to provide a reduced speed, two-wheel drive. Such a drive, in a manner similar to the reduced speed four-wheel drive, would be capable of automatic shifting between direct and reduced speed drives.

It will thus be seen that the objects set forth above, among those made apparent from the preceding description, are efficiently attained and, since certain changes may be made in the above constructions without departing from the spirit and scope of the invention, it is intended that all matter contained in the above description or shown in the accompanying drawings shall be interpreted as illustrative and not in a limiting sense.

It is also to be understood that the following claims are intended to cover all of the generic and specific features of the invention herein described and all statements of the scope of the invention which, as a matter of language, might be said to fall therebetween.

What is claimed is:

1. A torque transfer mechanism for a four wheel drive vehicle having an automatic transmission, said torque transfer mechanism comprising:
   an input shaft for receiving torque from said automatic transmission;
   a first output shaft connected to one of front and rear drive axles of the vehicle;
   a second output shaft connected to the other one of the drive axles;
   speed reducer means for transmitting the rotation of said input shaft to said first output shaft at a reduced speed of said output shaft when said speed reducer is engaged;
   means for nullifying the operation of said reducer means and directly coupling said input shaft with said first output shaft;
   means engaging said reducer for speed reduction;
   a mechanism for transmitting the rotation of said first output shaft to said second output shaft;
   a hydraulic control system including:
   a source of a first pressurized fluid;
   first conduit means for supplying said first pressurized fluid to a first driving means, said first driving means selectively engaging said means for directly coupling and nullifying said reducer means operation;
   second conduit means for supplying said first pressurized fluid to a second driving means, said second driving means selectively engaging and disengaging said means for engaging said reducer for speed reduction;
   a source of a second pressurized fluid;
   valve means for selectively connecting said first pressurized fluid to either said first or said second conduit means, said valve means being adapted to sense the pressure of said second fluid and connecting said first pressurized fluid to said second conduit means to engage and operate said reducer means only when said second pressurized fluid pressure falls below a predetermined level.

2. A torque transfer mechanism as claimed in claim 1, wherein said means for nullifying the operation of said reducer means and directly coupling said input shaft with said first output shaft includes a first friction member, and said means for engaging said reducer includes a second friction member.

3. A torque transfer mechanism as claimed in claim 2, wherein said first and second driving means include a first and second hydraulic servo motor respectively.

4. A torque transfer mechanism as claimed in claim 3, wherein said mechanism for transmitting the rotation of said first output shaft to said second output shaft includes a linkage mechanism.

5. A torque transfer mechanism as claimed in claim 4, wherein said fluids are pressurized in the hydraulic control system of said automatic transmission and said second pressurized fluid has its pressure level determined by a governor of said torque transfer mechanism, whereby the pressure of said second fluid is related to the rotational speed of said input shaft, and the pressure of said first fluid is substantially constant.

6. A torque transfer mechanism as claimed in claim 1, 4 or 5, wherein said valve means includes an axially movable spool having lands for selectively connecting said first and second conduits means with said first pressure liquid source in response to said first and second pressurized fluids acting on the opposite ends of said spool.

7. A torque transfer mechanism as claimed in claim 6, wherein said spool is moved axially by said fluid pressures acting on the opposite ends of said spool, and further including modulator means for modulating the pressure of said first fluid acting on said spool.

8. A torque transfer mechanism as claimed in claim 6, whlerein said valve further includes a spring acting on one end of said spool along with said second pressurized fluid, said spring urging said spool to a position connecting said first pressurized fluid to said first conduit means when no pressurized fluid is supplied to the other end of said spool.

9. A torque transfer mechanism as claimed in claim 7, wherein said valve further includes a spring acting on one end of said spool along with said second pressurized fluid, said spring urging said spool to a position connecting said first pressurized fluid to said first conduit means when no pressurized fluid is supplied to the other end of said spool.

10. A torque transfer mechanism for a four wheel drive vehicle having an automatic transmission, said torque transfer mechanism comprising:
an input shaft for receiving torque from said automatic transmission;
a first output shaft connected to one of front and rear drive axles of the vehicle;
a second output shaft connected to the other one of the drive axles;
speed reducer means for transmitting the rotation of said input shaft to said first output shaft at a reduced speed of said output shaft when said speed reducer is engaged;
a first engaging means for nullifying the operation of said reducer and directly coupling said input shaft with said first output shaft;
a second engaging means for operating said reducer;
a mechanism for transmitting the rotation of said first output shaft to said second output shaft;
a third engaging means for connecting and disconnecting said first output shaft to and from said second output shaft;
a hydraulic control system including:
first, second and third conduit means for supplying pressurized fluid to a plurality of driving means for engaging said first, second and third engaging means, respectively;
a source of a first pressurized fluid and a source of a second pressurized fluid;
an inhibitor valve controlled by said pressurized fluid for selectively connecting said first fluid with either said first or second conduit means; and
a selector valve for selectively supplying said first pressurized fluid to said third conduit means;
said inhibitor valve connecting said first fluid pressure with said second conduit means to operate said reducer means only when said second fluid pressure drops below a predetermined value.

11. A torque transfer mechanism as claimed in claim 10, wherein said first, second and third engaging means are friction members.

12. A torque transfer mechanism as claimed in claim 11, wherein said plurality of driving means include hydraulic servo motors.

13. A torque transfer mechanism as claimed in claim 12, wherein said mechanism for transmitting the rotation of said first output shaft to said second output shaft includes a linkage mechanism.

14. A torque transfer mechanism as claimed in claim 13, wherein said fluids are pressurized in the hydraulic control system of said automatic transmission and said second pressurized fluid has its pressure level determined by a governor of said torque transfer mechanism, whereby the pressure of said second fluid is related to the rotational speed of said input shaft, and the pressure of said first fluid is substantially constant.

15. A torque transfer mechanism as set as claimed in claim 10, 13 or 14, wherein said selector valve has a first position supplying said first pressurized fluid to said third conduit means and a second position supplying said first pressurized fluid to said third conduit means and said inhibitor valve.

16. A torque transfer mechanism as claimed in claim 10, 13 or 14, wherein said inhibitor valve has an axially movable spool operating in response to said first and second pressurized fluids acting respectively on one and the other ends thereof, and having a land for selectively connecting said first and second conduit means with said first pressurized fluid, and wherein said selector valve has a first position connecting said first pressurized fluid solely with said third conduit means, and a second position connecting said first pressurized fluid with said third conduit means and the other end of said inhibitor valve.

17. A torque transfer mechanism as claimed in claim 16, wherein said inhibitor valve includes a spring acting on said one end of said spool along with said second pressurized fluid, said spring constantly urging said spool to connect said first pressurized fluid with said first conduit means to drive said reducer means into a direct coupling state when no pressure is acting on the other end of said spool.

18. A torque transfer mechanism as claimed in claim 16, and further comprising a modulator valve, and wherein said first pressurized fluid is connected with said inhibitor valve through said modulator valve when said selector valve is in said second position, said modulator valve supplying modulated first fluid pressure to said other end of said spool.

* * * * *